US009055457B2

(12) United States Patent
Merlin et al.

(10) Patent No.: US 9,055,457 B2
(45) Date of Patent: Jun. 9, 2015

(54) TRANSMISSION PARAMETERS FOR VERY HIGH THROUGHPUT TRANSMISSION

(75) Inventors: Simone Merlin, San Diego, CA (US); Maarten Menzo Wentink, Naarden (NL)

(73) Assignee: QUALCOMM INCORPORATED, San Diego, CA (US)

( * ) Notice: Subject to any disclaimer, the term of this patent is extended or adjusted under 35 U.S.C. 154(b) by 187 days.

(21) Appl. No.: 13/587,290

(22) Filed: Aug. 16, 2012

(65) Prior Publication Data

US 2013/0208606 A1     Aug. 15, 2013

Related U.S. Application Data

(60) Provisional application No. 61/527,429, filed on Aug. 25, 2011.

(51) Int. Cl.
| | |
|---|---|
| *H04W 4/00* | (2009.01) |
| *H04W 24/02* | (2009.01) |
| *H04L 1/00* | (2006.01) |
| *H04B 7/06* | (2006.01) |

(52) U.S. Cl.
CPC ............. *H04W 24/02* (2013.01); *H04L 1/0025* (2013.01); *H04L 1/0029* (2013.01); *H04B 7/0697* (2013.01)

(58) Field of Classification Search
None
See application file for complete search history.

(56) References Cited

U.S. PATENT DOCUMENTS

| | | | |
|---|---|---|---|
| 8,040,843 B2 | 10/2011 | Furrer et al. | |
| 2007/0291913 A1* | 12/2007 | Trainin | 379/93.08 |
| 2010/0260138 A1 | 10/2010 | Liu et al. | |
| 2011/0026623 A1 | 2/2011 | Srinivasa et al. | |
| 2011/0116488 A1* | 5/2011 | Grandhi | 370/338 |
| 2011/0149927 A1 | 6/2011 | Stacey et al. | |
| 2011/0188482 A1 | 8/2011 | Vermani et al. | |
| 2011/0216723 A1 | 9/2011 | Sartori et al. | |
| 2012/0127940 A1* | 5/2012 | Lee et al. | 370/329 |
| 2012/0281774 A1* | 11/2012 | Lee et al. | 375/260 |
| 2012/0327838 A1* | 12/2012 | Seok | 370/312 |
| 2013/0039298 A1* | 2/2013 | Park et al. | 370/329 |

FOREIGN PATENT DOCUMENTS

| | | |
|---|---|---|
| JP | 2006083139 A1 | 8/2006 |
| JP | 2008530849 A | 8/2008 |
| JP | 2010016670 A | 1/2010 |

OTHER PUBLICATIONS

International Search Report and Written Opinion—PCT/US2012/052030—ISA/EPO—Oct. 10, 2012.
Ieee 802.11: "IEEE 802.11-10/1361 r3 Proposed TGac Draft Amendment", Jan. 18, 2011, XP55039973, Retrieved from the Internet: URL:https://mentor.ieee.org [retrieved on Oct. 4, 2012].

* cited by examiner

*Primary Examiner* — Chi H Pham
*Assistant Examiner* — Soon-Dong D Hyun
(74) *Attorney, Agent, or Firm* — Dang M. Vo

(57) ABSTRACT

Transmission parameters are determined for communication between apparatuses. These transmission parameters may specify, for example, a number of spatial streams, a bandwidth, and a transmission rate. Based on the determined parameters, a table of a set of tables comprising transmission parameters is identified and an index from the table is determined. Rate information is then sent in a frame from one of the apparatuses to the other. The rate information comprises several fields indicative of the index, the number of spatial streams, and bandwidth. The apparatus that receives the rate information may then use this information to identify the table and obtain transmission parameters from the table.

58 Claims, 9 Drawing Sheets

US 9,055,457 B2

TRANSMISSION PARAMETERS FOR VERY HIGH THROUGHPUT TRANSMISSION

CLAIM OF PRIORITY UNDER 35 U.S.C. §119

This application claims the benefit of and priority to commonly owned U.S. Provisional Patent Application No. 61/527,429, filed Aug. 25, 2011, and assigned the disclosure of which is hereby incorporated by reference herein.

BACKGROUND

1. Field

This application relates generally to wireless communication and more specifically, but not exclusively, to determining transmission parameters for very high throughput transmission.

2. Introduction

Some types of wireless communication devices employ multiple antennas to provide a higher level of performance as compared to devices that use a single antenna. For example, a wireless multiple-in-multiple-out (MIMO) system (e.g., a wireless local area network (WLAN) that supports IEEE 802.11n or 802.11ac) may use multiple transmit antennas to provide beamforming-based signal transmission. Typically, beamforming-based signals transmitted from different antennas are adjusted in phase (and optionally amplitude) such that the resulting signal power is focused toward a receiver device (e.g., an access terminal).

A wireless MIMO system may support communication for a single user at a time or for several users concurrently. Transmissions to a single user (e.g., a single receiver device) are commonly referred to as single-user MIMO (SU-MIMO), while concurrent transmissions to multiple users are commonly referred to as multi-user MIMO (MU-MIMO).

An access point (e.g., a base station) of a MIMO system employs multiple antennas for data transmission and reception, while each user employs one or more antennas. The access point communicates with the users via forward link channels and reverse link channels. In some aspects, a forward link (or downlink) channel refers to a communication channel from a transmit antenna of the access point to a receive antenna of a user, and a reverse link (or uplink) channel refers to a communication channel from a transmit antenna of a user to a receive antenna of the access point.

MIMO channels corresponding to transmissions from a set of transmit antennas to a receive antenna are referred to spatial streams since precoding (e.g., beamforming) is employed to direct the transmissions toward the receive antenna. Consequently, in some aspects each spatial stream corresponds to at least one dimension. A MIMO system thus provides improved performance (e.g., higher throughput and/or greater reliability) through the use of the additional dimensionalities provided by these spatial streams.

SUMMARY

A summary of several sample aspects of the disclosure follows. This summary is provided for the convenience of the reader and does not wholly define the breadth of the disclosure. For convenience, the term some aspects is used herein to refer to a single aspect or multiple aspects of the disclosure.

The disclosure relates in some aspects to determining transmission parameters for communication between apparatuses. These transmission parameters may include, for example, modulation and encoding scheme (MCS), a number of spatial streams, a bandwidth, and a transmission rate (e.g., a physical layer (PHY) rate). For example, a first apparatus may select the transmission parameters to be used by a second apparatus when the second apparatus transmits to the first apparatus. In such a case, upon determining (e.g., selecting) the transmission parameters, the first apparatus sends information indicative of the transmission parameters to the second apparatus. The second apparatus uses the received information to determine (e.g., identify) the transmission parameters to be used when transmitting to the first apparatus.

The disclosure relates in some aspects to the use of a set of tables for determining transmission parameters. Here, each table of the set comprises different transmission parameters (e.g., MCS parameters) that are to be used under different conditions. For example, each table of the set may correspond to different combinations of the number of spatial streams and bandwidth to be used during a transmission. An MCS index from (i.e., into) each table may then be used to identify the different MCSs listed in that table.

Thus, based on its determined transmission parameters (e.g., MCS, number of spatial streams, and bandwidth), the first apparatus may identify one table of the set of tables comprising transmission parameters and identify an index from the table corresponding to the selected MCS. The first apparatus then sends corresponding rate information to the other apparatus via a frame (e.g., via an Information Element that is included in the MAC payload of a MAC packet). In some aspects, the rate information comprises several fields indicative of the index, the number of spatial streams, and the bandwidth. Upon receipt of the rate information, the second apparatus uses this information to identify the table and retrieve the appropriate transmission parameters from the table. Accordingly, the second apparatus can then transmit to the first apparatus using the specified transmission parameters.

The disclosure relates in some aspects to a scheme for indicating Very High Throughput (VHT) rates for 802.11ac transmissions. In some implementations, such an indication is provided in an 802.11 Rate Identification field sent from one apparatus to another.

In contrast with non-VHT applications (e.g., as in 802.11 REVmb/D9.1 where the MCS values specified in high throughput (HT) MCS tables are uniquely identified by a given MCS index into the table), MCS tables for VHT in accordance with the teachings herein may be uniquely specified for a given bandwidth and number of spatial streams. Thus, a given MCS value may be specified by an appropriate combination of the bandwidth, the number of spatial streams, and the index into (or from) the corresponding table.

In accordance with some aspects of the disclosure, reserved values of a Mask field of the Rate Identification field are used to indicate whether the MCS is indicated in the VHT format, for a specified bandwidth. In addition, for VHT, the MCS Index field is re-interpreted (as compared to HT) to indicate the number of spatial streams (Nss) and the MCS index corresponding to the VHT MCS tables.

In some aspects, the Mask field indicates which fields in the Rate Identification field are to be used by the other apparatus. For example, a given set of values for the Mask field may indicate that a MCS Index field of the Rate Identification field includes information indicative of the number of spatial stream and the index. As another example, a given set of values for the Mask field may indicate a multiplier (e.g., corresponding to VHT) for a rate specified by a Rate field of the Rate Identification field.

In view of the above, in some aspects, communication in accordance with the teachings herein involves: determining transmission parameters for communication with an apparatus, wherein the determined transmission parameters comprise a number of spatial streams, a bandwidth, and a modulation and coding scheme; identifying a table of a set of tables of transmission parameters, wherein the identification of the table is based on the number of spatial streams and the bandwidth; determining an index from the identified table, wherein the determination of the index is based on the modulation and coding scheme; and transmitting a frame to the apparatus, wherein the frame contains indications of: the index, the number of spatial streams, and the bandwidth.

In addition, in some aspects, communication in accordance with the teachings herein involves: receiving a frame from an apparatus, wherein the frame contains indications of: an index, a number of spatial streams, and a bandwidth; identifying a table of a set of tables of transmission parameters, wherein the identification of the table is based on the number of spatial streams and the bandwidth; selecting a modulation and coding scheme from the identified table, wherein the selection of the modulation and coding scheme is based on the index; and transmitting data to the apparatus, wherein the transmission is conducted according to the number of spatial streams, the bandwidth, and the selected modulation and coding scheme.

BRIEF DESCRIPTION OF THE DRAWINGS

These and other sample aspects of the disclosure will be described in the detailed description and the appended claims that follow, and in the accompanying drawings, wherein:

Figure 1:
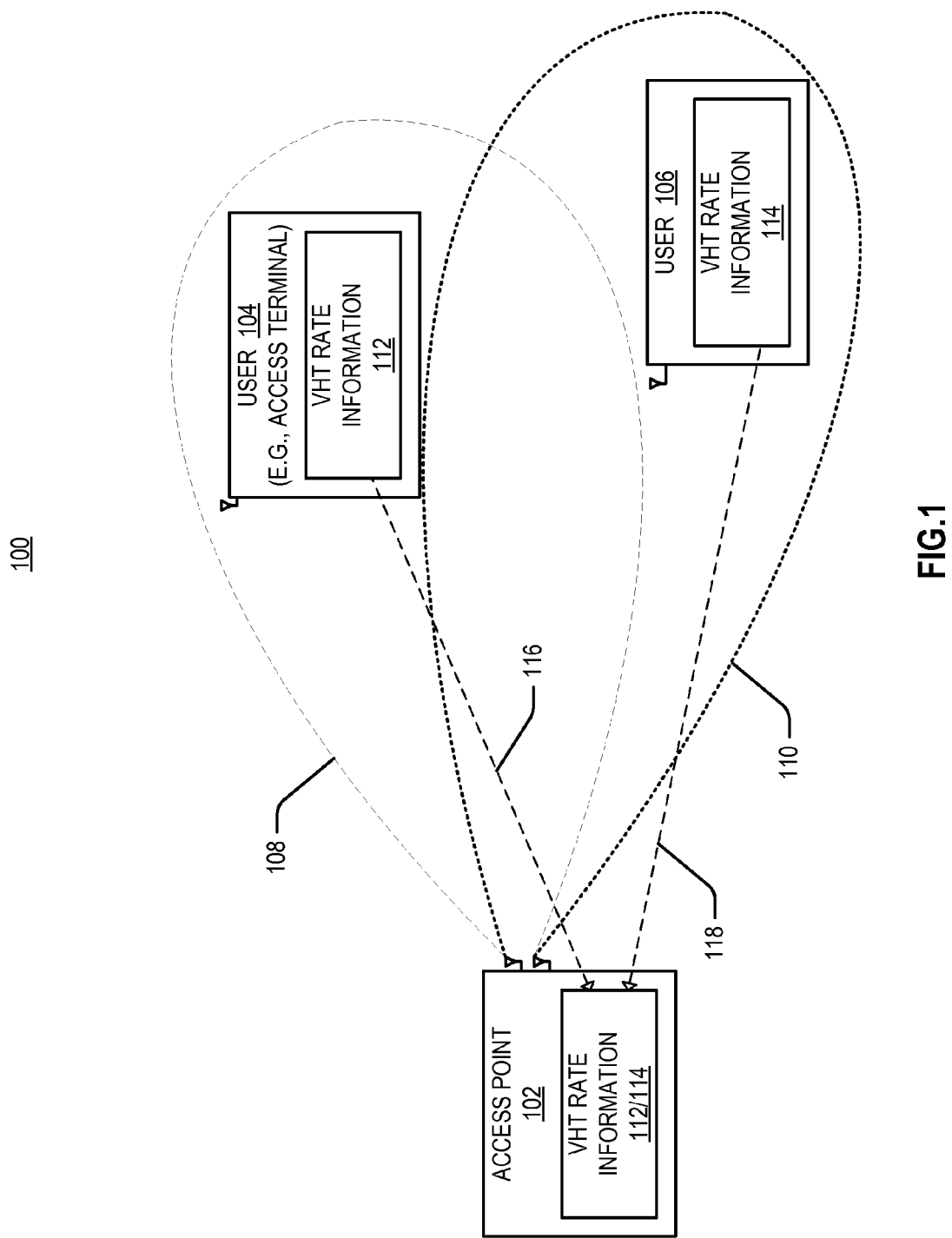
FIG. 1 is a simplified block diagram of several sample aspects of a communication system configured to exchange rate information for very high throughput (VHT) transmission.

In accordance with common practice, the features illustrated in the drawings are simplified for clarity and are generally not drawn to scale. That is, the dimensions and spacing of these features are expanded or reduced for clarity in most cases. In addition, for purposes of illustration, the drawings generally do not depict all of the components that are typically employed in a given apparatus (e.g., device) or method. Finally, like reference numerals may be used to denote like features throughout the specification and figures.

DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim. For example, in some aspects, an apparatus comprises: a processing system configured to: determine transmission parameters for communication with another apparatus (wherein the determined transmission parameters comprise a number of spatial streams, a bandwidth, and a modulation and coding scheme), identify a table of a set of tables of transmission parameters (wherein the identification of the table is based on the number of spatial streams and the bandwidth), and determine an index from the identified table (wherein the determination of the index is based on the modulation and coding scheme); and a transmitter configured to transmit a frame to the other apparatus (wherein the frame contains indications of: the index, the number of spatial streams, and the bandwidth). In addition, in some aspects, the frame comprises a Rate Identification field; the Rate Identification field comprises a first field and a second field; and the first field indicates whether the second field specifies the index.

FIG. 1 illustrates sample aspects of a wireless local area network (WLAN) 100 where an access point 102 employs MU-MIMO transmission to communicate with a user 104 and a user 106. The access point 102 employs precoding for transmissions via its antennas such that a spatial stream 108 (as represented in simplified form by a corresponding dashed line) is directed toward the user 104 and a spatial stream 110 (again, represented by a corresponding dashed line) is directed toward the user 106.

The users 104 and 106 represent wireless communication devices (e.g., 802.11ac devices) that are referred to as, for example, access terminals, user equipment, user devices, clients, etc., in various implementations. In this simplified example, the access point 102 employs two transmit antennas, the user 104 employs one receive antenna, and the user 106 employs one receive antenna. It should be appreciated that the teachings herein are applicable to other implementations that include a different number of transmit antennas, a different number of receive antennas, a different number of users, and a different number of spatial streams.

As discussed in more detail below, different transmission parameters may be employed for transmissions between the apparatuses of FIG. 1 in different circumstances. For example, different parameters may be employed for transmissions by different apparatuses, for different types of traffic, for different channel conditions, and so on. To ensure that a given apparatus is able to determine the transmission parameters used by another apparatus for a future communication, the apparatuses exchange rate information that is indicative of one or more transmission parameters. For example, prior to sending information over the spatial streams 108 and 110, the access point 102 may receive rate information 112 that was defined by each of the user 104 and rate information 114 that was defined by the user 106, as represented by the dashed lines 116 and 118, respectively. The access point 102 then uses the rate information 112 or 114 received from a given user for a subsequent transmission to that user via the corresponding spatial streams.

The rate information may take different forms in different implementations. In some implementations, the rate information specifies one or more of: the number of spatial streams that will be employed for the transmission, the bandwidth for the transmission, and information (e.g., an index into an MCS table) that may be used to determine the modulation and coding scheme (MCS) to be used for the transmission. Example of MCS parameters include, without limitation, modulation schemes (e.g., BPSK, QPSK, 16-QAM, 64-QAM, 256-QAM, etc.) and rates (e.g., 1/2, 3/4, 2/3, 5/6, etc.). As shown in the example of FIG. 1, in some implementations, rate information corresponds to a very high throughput transmission (e.g., an 802.11ac VHT transmission).

Figure 2:
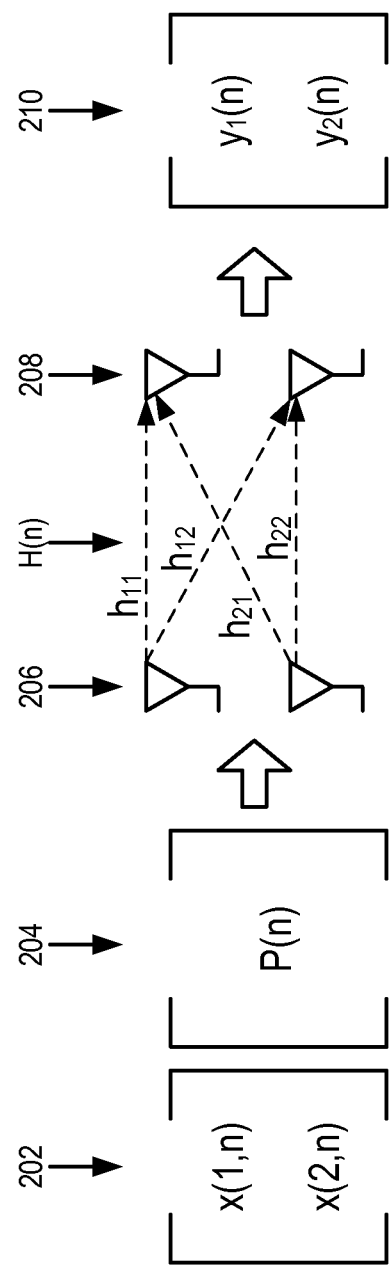
FIG. 2 is a simplified diagram of sample MU-MIMO transmissions.

For purposes of illustration, the concept of spatial streams is further described in a simplified manner in FIG. 2. This example describes a scenario where an access point is communicating with two access terminals. Here, as in the example of FIG. 1, two transmit antennas are used to send information to the two access terminals, each of which has a single receive antenna. As represented by the matrix 202, the access point generates an output signal x(1,n) destined for the first access terminal and generates an output signal x(2,n) destined for the second access terminal. The parameter n represents that the signals are sent over n tones using orthogonal frequency-division multiplexing (OFDM). The output signals are applied to a precoding matrix 204 (e.g., with elements $P_{11}$, $P_{12}$, $P_{21}$, and $P_{22}$ for a 2×2 matrix. The result of this operation is transmitted via two antennas 206. The resulting signals are transmitted via a channel matrix H(n) to the receive antennas 208, where the channels associated with the different transmit antenna-receive antenna pairs are represented by $h_{11}$, $h_{12}$, $h_{21}$, and $h_{22}$ as shown. The received signals are represented by a matrix 210 where, as stated above, one receive antenna is associated with each access terminal. Here, the signal $y_1(n)$ is the signal received at one access terminal and the signal $y_2(n)$ is the signal received at the other access terminal. Thus, in this example, transmissions from the access point to an access terminal employ two spatial streams (via channels $h_{11}$ and $h_{21}$ or via channels $h_{12}$ and $h_{22}$).

Efficient use of communication resources is predicated in some aspects on the proper selection of the transmission parameters employed for a given communication between apparatuses. These transmission parameters may include, for example, modulation and encoding scheme (MCS), a number of spatial streams, a bandwidth, and a transmission rate (e.g., a physical layer (PHY) rate). In a MU-MIMO system, different transmission parameters are typically employed for downlink transmissions and uplink transmissions. Accordingly, prior to commencing these transmissions, the apparatuses exchange information so that each apparatus is able to specify the transmission parameters being used by the other apparatus.

In non-VHT applications (e.g., HT applications), MCS values may be uniquely identified simply by a given index into a table. For example, in table 19 specified by IEEE 802.11 REVmb/D9.1, a given MCS index will correspond to a particular MCS, a particular number of streams, and so on.

In contrast, in accordance with the teachings herein, the tables of a set of MCS tables for VHT applications (e.g., specified in a table 22 for IEEE 802.11ac/D2.2) are uniquely defined for different number of spatial streams and bandwidth combination. That is, one table is associated with one bandwidth and number of spatial streams pair (e.g., 20 MHz and 2 spatial streams), another table is associated with another bandwidth and number of spatial streams pair (e.g., 20 MHz and 3 spatial streams), and so on. By subdividing the tables in this manner, a relatively small number (e.g., 9) of index values may be used to identify the MCS from a given table.

Figure 3:
FIG. 3 is a simplified diagram of a Rate Identification field.

The disclosure relates in some aspects to a scheme for indicating VHT rates for 802.11ac transmissions. For example, in some implementations, such an indication is provided in an 802.11 Rate Identification field sent from an access terminal to an access point. FIG. 3 illustrates an example of a Rate Identification field.

In some implementations, the Rate Identification field is 4 octets in length. The Rate Identification field contains the rate identification information for a frame that is not the current frame transmitted or received by an apparatus (e.g., an access terminal such as a station). Thus, prior to sending and receiving frames based on the rate specified by the Rate Identification field, user services may exchange frame rate information for those frames.

In accordance with the teachings herein, reserved values of the Mask field of the Rate Identification field are used to indicate whether the MCS is indicated in the VHT format, for a specified bandwidth. In addition, for VHT, the MCS Index field is re-interpreted to indicate the number of spatial streams (Nss) and the MCS index corresponding to the MCS tables.

Figure 4:
FIG. 4 is a simplified diagram of a Mask field of a Rate Identification field.

The Mask field specifies which other fields in the Rate Identification field are used by an apparatus (e.g., an access terminal such as a station). An example format of the Mask field (e.g., 1 octet in length) is shown in FIG. 4.

An example of how the MCS Selector field may be used to re-interpret the MCS Index field follows. The tables and sections listed below refer to IEEE 802.11ac/D2.2.

The MCS Selector field set to 0 indicates that the MCS Index field is reserved.

The MCS Selector field set to 1 indicates that the MCS Index field specifies an index value that is taken from Table 20-30 (MCS parameters for mandatory 20 MHz, Nss=1, Nes=1) through Table 20-33 (MCS parameters for optional 20 MHz, Nss=4, Nes=1, EQM) and Table 20-39 (MCS parameters for optional 20 MHz, Nss=2, Nes=1, UEQM) through Table 20-41 (MCS parameters for optional 20 MHz, Nss=4, Nes=1, UEQM) in 20.6 (Parameters for high throughput (HT) MCSs).

The MCS Selector field set to 2 indicates that the MCS Index field specifies an index value that is taken from Table 20-34 (MCS parameters for optional 40 MHz, Nss=1, Nes=1) through Table 20-38 (MCS parameters for optional 40 MHz MCS 32 format, Nss=1, Nes=1) and Table 20-43 (MCS parameters for optional 40 MHz, Nss=3, UEQM) through Table 20-44 (MCS parameters for optional 40 MHz, Nss=4, UEQM) in 20.6 (Parameters for HT MCSs).

The MCS Selector field set to 3 indicates that the MCS Index field specifies values that are taken from Table 22-30 (VHT MCSs for mandatory 20 MHz, Nss=1) through Table 22-37 (VHT MCSs for optional 20 MHz, Nss=8), indicating a VHT MCS for a 20 MHz channel width.

The MCS Selector field set to 4 indicates that the MCS Index field specifies values that are taken from Table 22-38 (VHT MCSs for mandatory 40 MHz, Nss=1) through Table 22-45 (VHT MCSs for optional 40 MHz, Nss=8), indicating a VHT MCS for a 40 MHz channel width.

The MCS Selector field set to 5 indicates that the MCS Index field specifies values that are taken from Table 22-46

(VHT MCSs for mandatory 80 MHz, Nss=1) through Table 22-53 (VHT MCSs for optional 80 MHz, Nss=8), indicating a VHT MCS for an 80 MHz channel width.

The MCS Selector field set to 6 indicates that the MCS Index field specifies values that are taken from Table 22-54 (VHT MCSs for optional 160 MHz and 80+80 MHz, Nss=1) through Table 22-61 (VHT MCSs for optional 160 MHz or 80+80 MHz, Nss=8), indicating a VHT MCS for a 160 MHz or 80+80 MHz channel width.

The MCS Selector field value of 7 is reserved.

The Rate Type field set to 0 indicates that the Rate field is reserved.

The Rate Type field set to 1 indicates that the Rate field specifies a data rate that is in the basic rate set.

The Rate Type field set to 2 indicates that the Rate field specifies a data rate that is not in the basic rate set.

If the MCS selector is 1 or 2, the MCS Index field is a 1 octet unsigned integer that specifies the row index for one of the MCS parameter tables in 20.6 (Parameters for HT MCSs).

Figure 5:
FIG. 5 is a simplified diagram of a VHT MCS Index field of a Rate Identification field.

If the MCS selector is 3, 4, 5, or 6, the MCS Index field is interpreted as in FIG. 5. In FIG. 5, the Nss subfield indicates the number of spatial streams and the MCS Index Row subfield indicates a value from the MCS Index column of the MCS table in 22.5 (Parameters for VHT MCSs) corresponding to the channel width (bandwidth) and Nss values.

If the MCS selector is set to either 1 or 2, the Rate field contains a 2-octet unsigned integer that specifies the PHY rate in 0.5 Mb/s units.

If MCS selector is set to 3, 4, 5, or 6, the Rate field contains a 2-octet unsigned integer that specifies the PHY rate in 1.5 Mb/s units.

Figure 6:
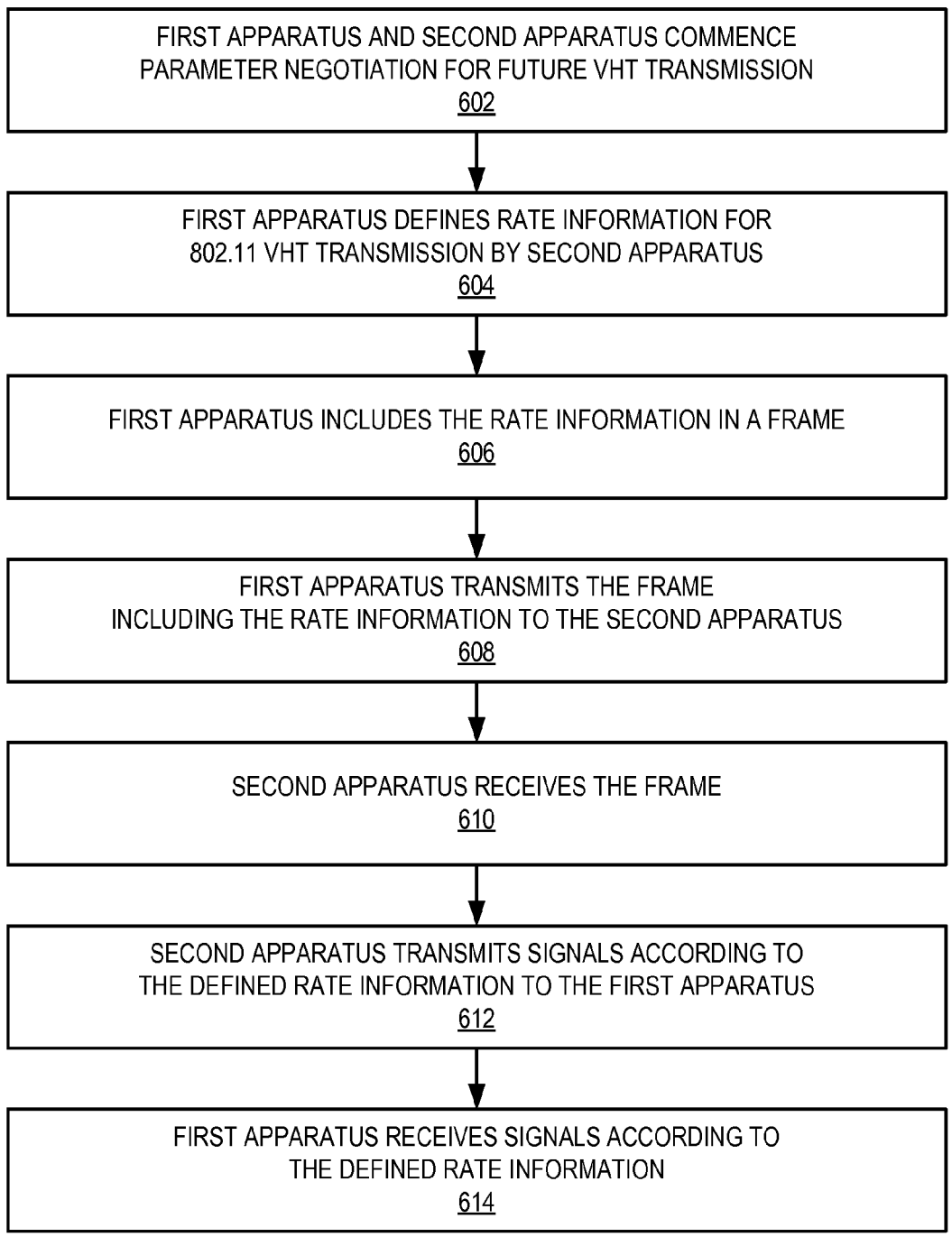
FIG. 6 is a flowchart of several sample aspects of operations performed in conjunction with exchanging rate information.

FIG. 6 illustrates an overview of rate information exchange operations that may be performed in accordance with the teachings herein. For purposes of illustration, the operations of FIG. 6 (or any other operations discussed or taught herein) may be described as being performed by specific components. For example, in some aspects, the operations of FIG. 6 are described from the perspective of a first apparatus (e.g., an access terminal) that communicates with a second apparatus (e.g., an access point). These operations may be performed by other types of components and may be performed using a different number of components in other implementations. Also, it should be appreciated that one or more of the operations described herein may not be employed in a given implementation. For example, one entity may perform a subset of the operations and pass the result of those operations to another entity.

As represented by block 602 of FIG. 6, at some point in time, the first apparatus commences parameter negotiation with the second apparatus to determine one or more parameters that are to be used for a subsequent transmission from the second apparatus to the first apparatus.

As represented by block 604, the first apparatus defines rate information for an 802.11 VHT transmission. This involves, for example, determining the number of spatial streams, the bandwidth, the transmission rate, and the MCS to be used for the transmission. As discussed herein, the MCS may be specified as an index to a table. In some aspects, the operations of block 604 involve defining a Rate Identification field that comprises a Mask field, an MCS Index field, and a Rate field as discussed above in conjunction with FIGS. 3-5.

As represented by block 606, the first apparatus includes the rate information in a frame. For example, the frame may include the Rate Identification field described above for FIG. 3. In general, the term frame refers to the data portion of a packet. For example, a frame may be defined as the portion of a PHY packet that follows the PHY preamble. In some contexts, a frame may be referred to as a protocol data unit or a protocol service data unit.

As represented by block 608, the first apparatus transmits the frame to the second apparatus. For example, the rate information may be sent via an Information Element that is included in the MAC payload of a MAC packet sent to the second apparatus.

The second apparatus then receives the frame as represented by block 610. As represented by block 612, at some later point in time, the second apparatus transmits signals to the first apparatus according to the defined rate information. Here, based on the rate information received from the first apparatus at block 610, the second apparatus is able to determine the number of spatial streams, the transmission rate, and the MCS to be used for the transmission of block 612.

As represented by block 614, the first apparatus thus receives signals transmitted by the second apparatus according to the defined rate information.

Figure 7:
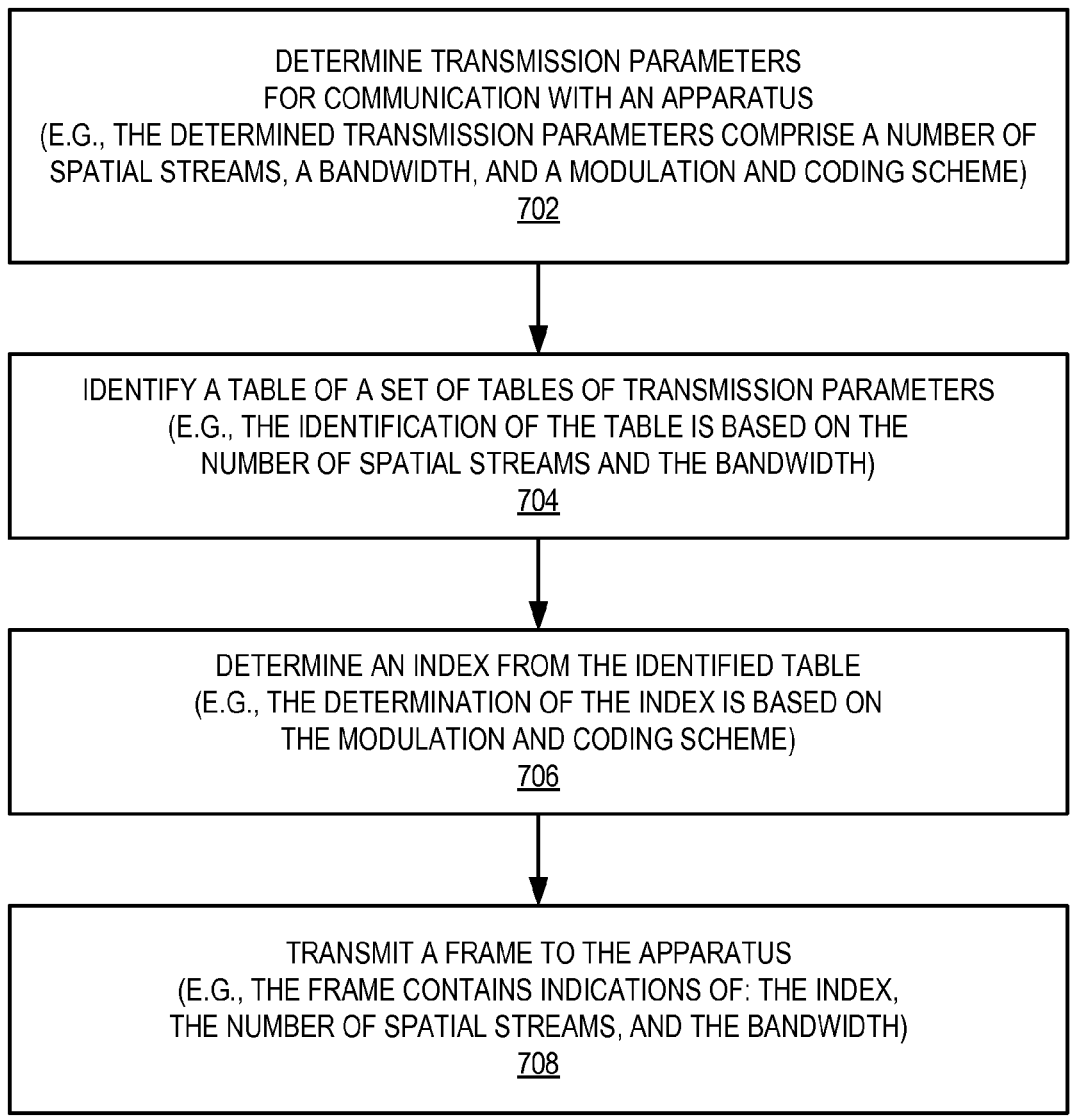
FIG. 7 is a flowchart of several sample aspects of operations performed in conjunction with determining transmission parameters.
Figure 8:
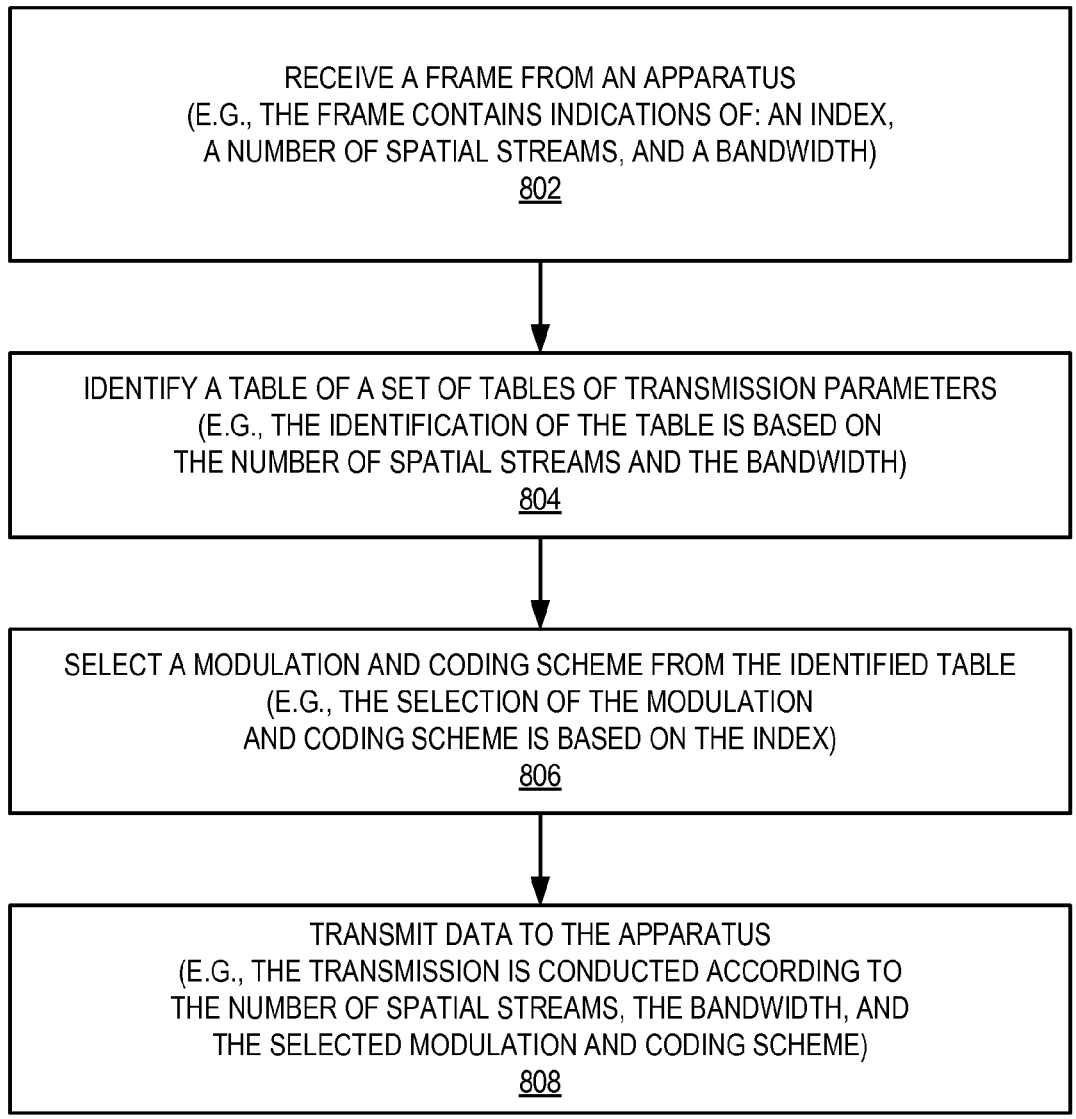
FIG. 8 is a flowchart of several sample aspects of operations performed in conjunction with determining transmission parameters.

FIGS. 7 and 8 illustrate, in more detail, operations that may be performed by the first and second apparatuses or some other suitable entity. FIG. 7 describes sample operations by an apparatus that determines transmission parameters for a transmission directed to that apparatus. FIG. 8 describes sample operations by an apparatus that determines transmission parameters for a transmission that it will make to another apparatus.

As represented by block 702 of FIG. 7, transmission parameters for communication with an apparatus are determined. For example, based on the current channel conditions, a first apparatus will select the transmission parameters to be used by a second apparatus for transmission to the first apparatus. In some aspects, the determined transmission parameters comprise a number of spatial streams, a bandwidth, and a modulation and coding scheme.

As represented by block 704, a table of a set of tables of transmission parameters is identified. In some aspects, the identification of the table is based on the number of spatial streams and the bandwidth determined at block 702 as discussed herein. For example, if the number of spatial streams is 2 and the specified bandwidth is 40 MHz (from block 702), Table 22-39 (IEEE P802.11ac/D2.2) may be identified at block 704.

As represented by block 706, an index from (into) the identified table is identified. In some aspects, the determination of the index is based on the modulation and coding scheme determined at block 702. For example, the first apparatus may identify the MCS index from the table identified at block 704 that corresponds to the MCS selected at block 702. Continuing with the example from block 704, if 64-QAM 2/3 rate modulation is selected at block 702, an MCS index of 5 is identified at block 706.

As represented by block 708, a frame is transmitted to the apparatus. As discussed herein, the frame contains an indication of the index identified at block 706, an indication of the number of spatial streams determined at block 702, and an indication of the bandwidth determined at block 702.

As discussed herein, the frame may comprise a Rate Identification field that includes this information. This Rate Identification field may comprise a first field and a second field, where the first field indicates whether the second field specifies an index to a table of transmission parameter information (e.g., 802.11ac VHT MCS information) that corresponds to the specified bandwidth. In some aspects, the first field comprises an MCS Selector field and the second field comprises an MCS Index field. In some aspects, the specified bandwidth is 20 MHz, 40 MHz, 80 MHz, 80+80 MHz, or 160 MHz. In some aspects, the second field specifies the number of spatial streams and a row of the identified table. In some aspects, the Rate Identification field further comprises a third field that specifies a PHY rate. In some aspects, the first field indicates whether a value contained in the third field corresponds to a unit greater than 0.5 Mbits/s. In some aspects, the first field indicates whether a value contained in the third field corresponds to a 1.5 MBit/s unit (e.g., a value of 1 corresponds to 1.5 MBits/s, a value of 2 corresponds to 3.0 MBits/s, and so on).

Referring now to the operations of FIG. 8, at some point in time, a frame is received from an apparatus (block 802). For example, the frame may be received from an apparatus that performed the operations of FIG. 7. Thus, the frame may contain indications of: an index, a number of spatial streams, and a bandwidth.

As represented by block 804, a table of a set of tables of transmission parameters is identified. In some aspects, the identification of the table is based on the number of spatial streams and the bandwidth specified in the frame received at block 802. For example, if the specified number of spatial streams is 2 and the specified bandwidth is 40 MHz, Table 22-39 (IEEE P802.11ac/D2.2) may be identified at block 804.

As represented by block 806, a modulation and coding scheme from the identified table is selected. In some aspects, the selection of the modulation and coding scheme is based on the index specified in the frame received at block 802. Continuing with the example from block 804, if the received MCS index is 5, 64-QAM 2/3 rate modulation is selected at block 806.

As represented by block 808, data is transmitted to the apparatus. As discussed herein, the transmission is conducted according to the number of spatial streams, the bandwidth, and the selected modulation and coding scheme determined above.

Figure 9:
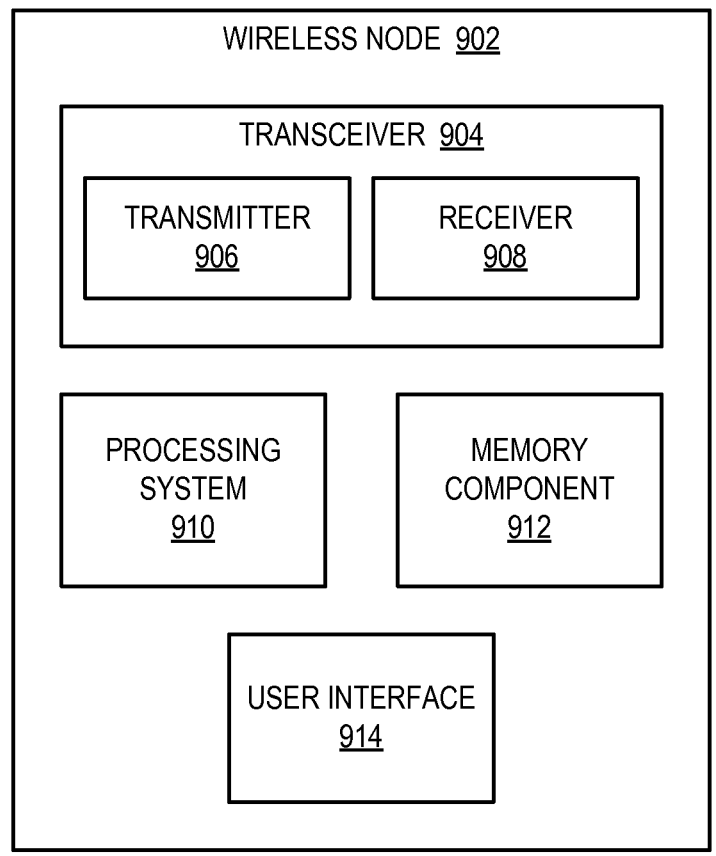
FIG. 9 is a simplified block diagram of several sample aspects of components that may be employed in communication nodes.

FIG. 9 illustrates several sample components (represented by corresponding blocks) that are incorporated into a wireless node 902 to perform rate information exchange operations as taught herein. In a typical implementation, the wireless node 902 is an access point or an access terminal (e.g., corresponding to the access point 102 or the user 104 of FIG. 1). The components described in FIG. 9 may be incorporated into other nodes in a communication system. Also, a given node may contain one or more of the described components. For example, a wireless node may contain multiple transceiver components that enable the wireless node to operate on multiple carriers and/or communicate via different technologies.

As shown in FIG. 9, the wireless node 902 includes one or more transceivers (as represented by a transceiver 904) for communicating with other nodes. Each transceiver 904 includes a transmitter 906 for sending signals (e.g., transmitting signals comprising spatial streams, frames, packets, etc.) and a receiver 908 for receiving corresponding signals.

The wireless node 902 also includes other components that are used in conjunction with rate information exchange-related operations as taught herein. The wireless node 902 includes a processing system 910 for processing received signals and/or signals to be transmitted and for providing other related functionality as taught herein. For example, in some implementations the processing system performs one or more of: determining transmission parameters for communication with an apparatus, identifying a table of a set of tables of transmission parameters, or determining an index from the identified table. As another example, in some implementations the processing system performs one or more of: identifying a table of a set of tables of transmission parameters, or selecting a modulation and coding scheme from the identified table. In some implementations, operations described herein as being performed by the processing system 910 may instead be performed by the transceiver 904, and vice versa. The wireless node 902 includes a memory component 912 (e.g., including a memory device) for maintaining information (e.g., rate information). The wireless node 902 also includes a user interface 914 for providing indications (e.g., audible and/or visual indications) to a user and/or for receiving user input (e.g., upon user actuation of a sensing device such a microphone, a camera, a keypad, and so on).

The components of FIG. 9 may be implemented in various ways. In some implementations the components of FIG. 9 are implemented in one or more circuits such as, for example, one or more processing systems and/or one or more ASICs (which may include one or more processing systems). Here, each circuit (e.g., processing system) may use and/or incorporate memory for storing information or executable code used by the circuit to provide this functionality. For example, some of the functionality represented by block 904 and some or all of the functionality represented by blocks 910-914 may be implemented by a processing system of a wireless node and memory of the wireless node (e.g., by execution of appropriate code and/or by appropriate configuration of processing system components).

Figure 10:
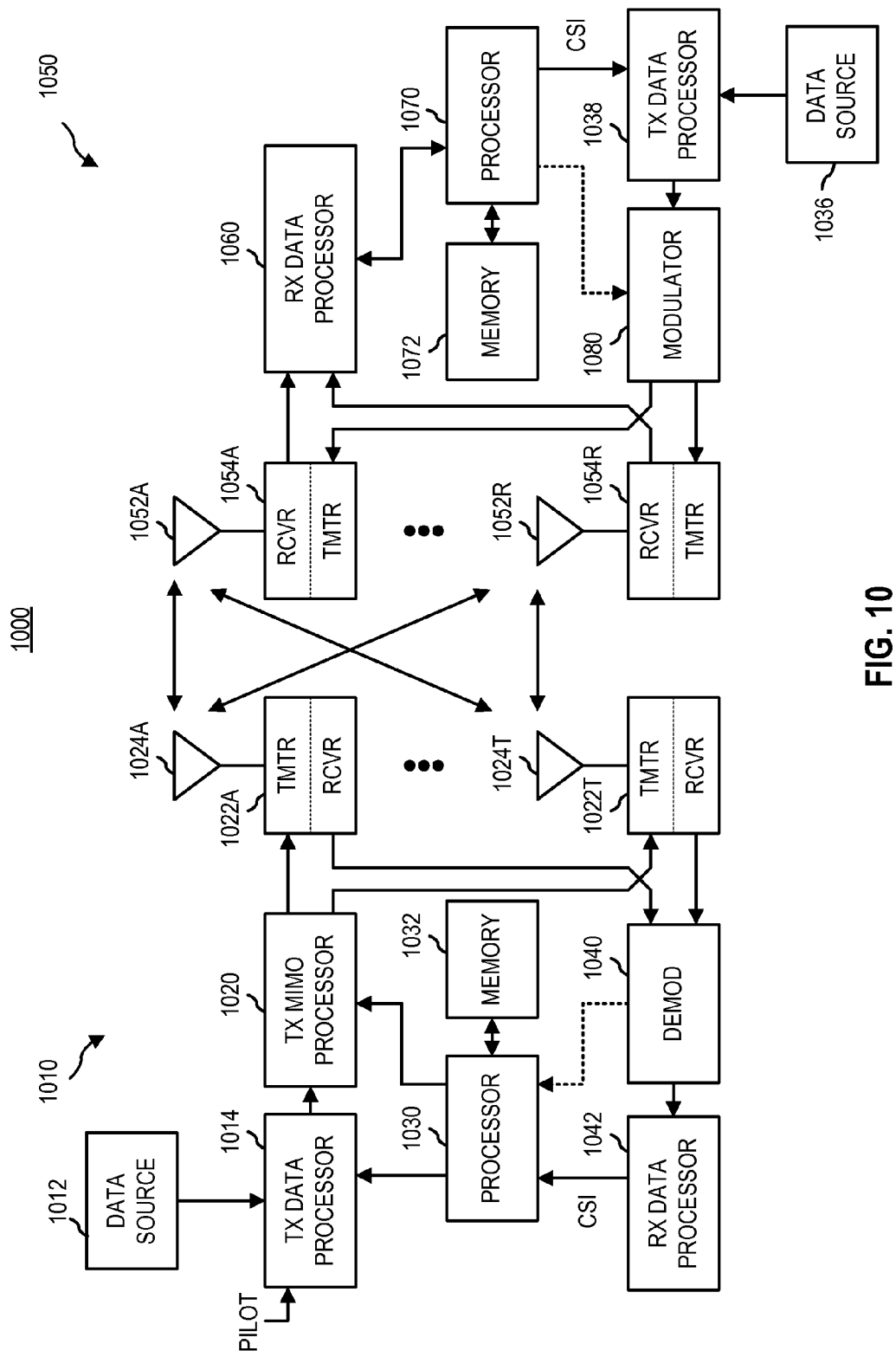
FIG. 10 is a simplified block diagram of several sample aspects of communication components.

FIG. 10 illustrates in more detail sample components that may be employed in a pair of wireless nodes of a MIMO system 1000. In this example, the wireless nodes are labeled as a wireless device 1010 (e.g., an access point) and a wireless device 1050 (e.g., an access terminal). It should be appreciated that a MU-MIMO system will include other devices (e.g., access terminals) similar to the wireless device 1050. To reduce the complexity of FIG. 10, however, only one such device is shown.

The MIMO system 1000 employs multiple ($N_T$) transmit antennas and multiple ($N_R$) receive antennas for data transmission. A MIMO channel formed by the $N_T$ transmit and $N_R$ receive antennas is decomposed into $N_S$ independent channels, which are also referred to as spatial channels, where $N_S \leq \min\{N_T, N_R\}$.

The MIMO system 1000 supports time division duplex (TDD) and/or frequency division duplex (FDD). In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Referring initially to the device 1010, traffic data for a number of data streams is provided from a data source 1012 to a transmit (TX) data processor 1014. Each data stream is then transmitted over a respective transmit antenna.

The TX data processor 1014 formats, codes, and interleaves the traffic data for each data stream based on a particular coding scheme selected for that data stream to provide coded data. The coded data for each data stream is multiplexed with pilot data using OFDM techniques or other suitable techniques. The pilot data is typically a known data pattern that is processed in a known manner and used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream are typically determined by instructions performed by a processor 1030. A memory 1032 stores program code, data, and other information used by the processor 1030 or other components of the device 1010.

The modulation symbols for all data streams are then provided to a TX MIMO processor 1020, which further processes the modulation symbols (e.g., for OFDM). The TX MIMO processor 1020 then provides $N_T$ modulation symbol streams to $N_T$ transceivers (XCVR) 1022A through 1022T. In some aspects, the TX MIMO processor 1020 applies beamforming weights to the symbols of the data streams and to the antenna from which the symbol is being transmitted.

Each transceiver 1022 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1022A through 1022T are then transmitted from $N_T$ antennas 1024A through 1024T, respectively.

At the device 1050, the transmitted modulated signals are received by $N_R$ antennas 1052A through 1052R and the received signal from each antenna 1052 is provided to a respective transceiver (XCVR) 1054A through 1054R. Each transceiver 1054 conditions (e.g., filters, amplifies, and downconverts) a respective received signal, digitizes the conditioned signal to provide samples, and further processes the samples to provide a corresponding "received" symbol stream.

A receive (RX) data processor 1060 then receives and processes the $N_R$ received symbol streams from $N_R$ transceivers 1054 based on a particular receiver processing technique to provide $N_T$ "detected" symbol streams. The RX data processor 1060 then demodulates, deinterleaves, and decodes each detected symbol stream to recover the traffic data for the data stream. The processing by the RX data processor 1060 is complementary to that performed by the TX MIMO processor 1020 and the TX data processor 1014 at the device 1010.

A processor 1070 periodically determines which precoding matrix to use (discussed below). The processor 1070 formulates a reverse link message comprising a matrix index portion and a rank value portion. A memory 1072 stores program code, data, and other information used by the processor 1070 or other components of the device 1050.

The reverse link message comprises various types of information regarding the communication link and/or the received data stream. The reverse link message is processed by a TX data processor 1038, which also receives traffic data for a number of data streams from a data source 1036, modulated by a modulator 1080, conditioned by the transceivers 1054A through 1054R, and transmitted back to the device 1010.

At the device 1010, the modulated signals from the device 1050 are received by the antennas 1024, conditioned by the transceivers 1022, demodulated by a demodulator (DEMOD) 1040, and processed by a RX data processor 1042 to extract the reverse link message transmitted by the device 1050. The processor 1030 then determines which precoding matrix to use for determining the beamforming weights by processing the extracted message.

In some implementations, one or more of the processors 1030, 1014, 1020, 1038, 1042, 1060, or 1070 perform the rate information exchange-related operations described herein. It should be appreciated that these operations may be performed in cooperation with other components of FIG. 10 and/or by other components of FIG. 10 in some implementations.

A wireless node may include various components that perform functions based on signals that are transmitted by or received at the wireless node. For example, in some implementations, a wireless node comprises a user interface configured to output an indication based on a signal that is received through the use of exchanged rate information as taught herein. In some implementations, a wireless node comprises a receiver configured to receive a signal (e.g., message) requesting rate information (e.g., thereby commencing a rate information exchange) as taught herein.

A wireless node as taught herein may communicate via one or more wireless communication links that are based on or otherwise support any suitable wireless communication technology. For example, in some aspects a wireless node may associate with a network such as a local area network (e.g., a Wi-Fi network) or a wide area network. To this end, a wireless node may support or otherwise use one or more of a variety of wireless communication technologies, protocols, or standards such as, for example, Wi-Fi, WiMAX, CDMA, TDMA, OFDM, and OFDMA. Also, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a device may comprise a wireless transceiver with associated transmitter and receiver components that may include various components (e.g., signal generators and signal processors) that facilitate communication over a wireless medium.

The teachings herein may be incorporated into (e.g., implemented within or performed by) a variety of apparatuses (e.g., devices). For example, one or more aspects taught herein may be incorporated into a phone (e.g., a cellular phone), a personal data assistant (PDA), an entertainment device (e.g., a music or video device), a headset (e.g., headphones, an earpiece, etc.), a microphone, a medical sensing device (e.g., a sensor such as a biometric sensor, a heart rate monitor, a pedometer, an EKG device, a smart bandage, a vital signal monitor, etc.), a user I/O device (e.g., a watch, a remote control, a switch such as a light switch, a keyboard, a mouse, etc.), an environment sensing device (e.g., a tire pressure monitor), a monitor that may receive data from the medical or environment sensing device, a computer, a point-of-sale device, an entertainment device, a hearing aid, a set-top box, a gaming device, or any other suitable device. The communication devices described herein may be used in any type of sensing application, such as for sensing automotive, athletic, and physiological (medical) responses. Any of the disclosed aspects of the disclosure may be implemented in many different devices. For example, in addition to medical applications as discussed above, the aspects of the disclosure may be applied to health and fitness applications. Additionally, the aspects of the disclosure may be implemented in shoes for different types of applications. There are other multitudes of applications that may incorporate any aspect of the disclosure as described herein.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as a station, a user, a client, user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a WLAN access point, a WLAN base station, a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects a wireless node comprises an access device (e.g., an access point) for a communication system. Such an access device provides, for example, connectivity to another network (e.g., a wide area network such as the Internet or a cellular network) via a wired or wireless communication link. Accordingly, the access device enables another device (e.g., a wireless station) to access the other network or some other functionality. In addition, it should be appreciated that one or both of the devices may be portable or, in some cases, relatively non-portable. Also, it should be appreciated that a wireless node also may be capable of transmitting and/or receiving information in a non-wireless manner (e.g., via a wired connection) via an appropriate communication interface.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Rel99, Rel5, Rel6, Rel7) technology, as well as 3GPP2 (e.g., 1xRTT, 1xEV-DO Rel0, RevA, RevB) technology and other technologies.

Figure 11:
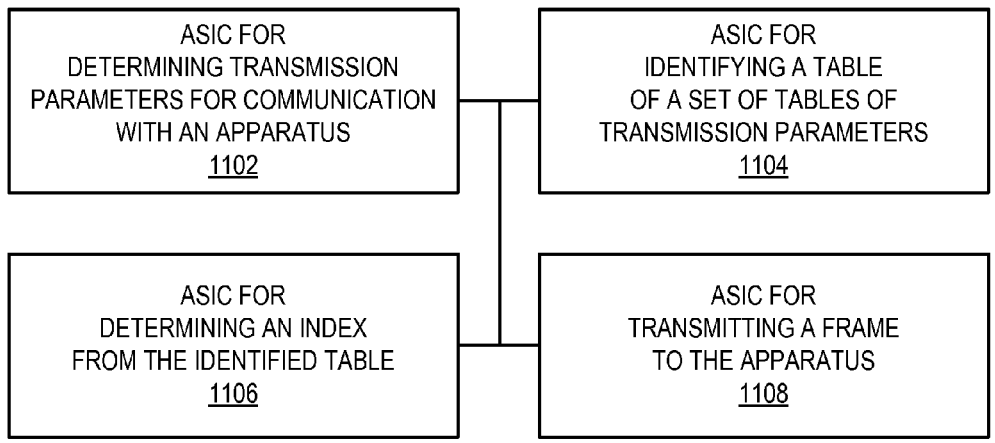
FIGS. 11 and 12 are simplified block diagrams of several sample aspects of apparatuses configured to exchange rate information as taught herein.
Figure 12:
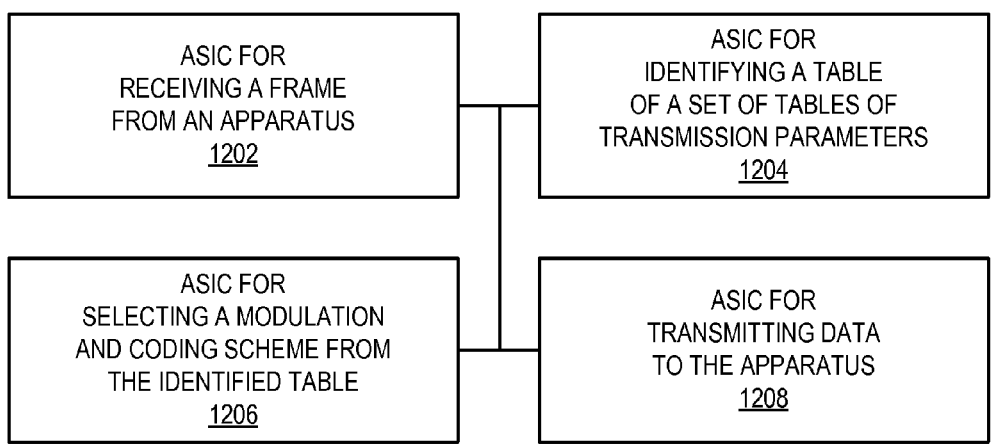

The components described herein may be implemented in a variety of ways. Referring to FIGS. 11 and 12, apparatuses 1100 and 1200 are represented as a series of interrelated functional blocks that represent functions implemented by, for example, one or more integrated circuits (e.g., an ASIC) or implemented in some other manner as taught herein. As discussed herein, an integrated circuit may include a processing system, software, other components, or some combination thereof.

The apparatus 1100 includes one or more modules that perform one or more of the functions described above with regard to various figures. For example, an ASIC for determining transmission parameters for communication with an apparatus 1102 corresponds to, for example, a processing system as discussed herein. An ASIC for identifying a table of a set of tables of transmission parameters 1104 corresponds to, for example, a processing system as discussed herein. An ASIC for determining an index from the identified table 1106 corresponds to, for example, a processing system as discussed herein. An ASIC for transmitting a frame to the apparatus 1108 corresponds to, for example, a transmitter as discussed herein.

The apparatus 1200 also includes one or more modules that perform one or more of the functions described above with regard to various figures. For example, an ASIC for receiving a frame from an apparatus 1202 corresponds to, for example, a receiver as discussed herein. An ASIC for identifying a table of a set of tables of transmission parameters 1204 corresponds to, for example, a processing system as discussed herein. An ASIC for selecting a modulation and coding scheme from the identified table 1206 corresponds to, for example, a processing system as discussed herein. An ASIC for transmitting data to the apparatus 1208 corresponds to, for example, a transmitter as discussed herein.

As noted above, in some aspects these components may be implemented via appropriate processing system components. These processing system components may in some aspects be implemented, at least in part, using structure as taught herein. In some aspects a processing system may be configured to implement a portion or all of the functionality of one or more of these components. In some aspects, one or more of any components represented by dashed boxes are optional.

As noted above, the apparatuses 1100 and 1200 comprise one or more integrated circuits in some implementations. For example, in some aspects a single integrated circuit implements the functionality of one or more of the illustrated components, while in other aspects more than one integrated circuit implements the functionality of one or more of the illustrated components.

In addition, the components and functions represented by FIGS. 11 and 12 as well as other components and functions described herein, may be implemented using any suitable means. Such means are implemented, at least in part, using corresponding structure as taught herein. For example, the components described above in conjunction with the "ASIC for" components of FIGS. 11 and 12 correspond to similarly designated "means for" functionality. Thus, one or more of such means is implemented using one or more of processing system components, integrated circuits, or other suitable structure as taught herein in some implementations. Several examples follow. In some aspects, means for determining transmission parameters for communication with an apparatus comprises a processing system. In some aspects, means for identifying a table of a set of tables of transmission parameters comprises a processing system. In some aspects, means for determining an index from the identified table comprises a processing system. In some aspects, means for transmitting a frame to the apparatus comprises a transmitter. In some aspects, means for receiving a frame from an apparatus comprises a receiver. In some aspects, means for identifying a table of a set of tables of transmission parameters comprises a processing system. In some aspects, means for selecting a modulation and coding scheme from the identified table comprises a processing system. In some aspects, means for transmitting data to the apparatus comprises a transmitter.

Also, it should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" used in the description or the claims means "A or B or C or any combination of these elements."

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

Those of skill in the art understand that information and signals may be represented using any of a variety of different technologies and techniques. For example, any data, instructions, commands, information, signals, bits, symbols, and chips referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media, computer-readable storage medium). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. In some aspects, a computer-readable medium comprises codes executable to perform one or more operations as taught herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:
1. A method of communication, comprising:
  determining transmission parameters for communication with an apparatus, wherein the determined transmission parameters comprise a number of spatial streams, a bandwidth, and a modulation and coding scheme;
  identifying a table of a set of tables of transmission parameters, wherein the identification of the table is based on the number of spatial streams and the bandwidth;
  determining an index from the identified table, wherein the determination of the index is based on the modulation and coding scheme; and
  transmitting a frame to the apparatus, wherein the frame contains indications of: the index, the number of spatial streams, and the bandwidth.

2. The method of claim 1, wherein:
the frame comprises a Rate Identification field;
the Rate Identification field comprises a first field and a second field; and
the first field indicates whether the second field specifies the index.

3. The method of claim 2, wherein:
the first field comprises an MCS Selector field; and
the second field comprises an MCS Index field.

4. The method of claim 3, wherein:
the MCS Selector field set to 3 indicates that the MCS Index field specifies values taken from a first one of the tables indicating a very high throughput modulation and coding scheme for a 20 MHz channel width;
the MCS Selector field set to 4 indicates that the MCS Index field specifies values taken from a second one of the tables indicating a very high throughput modulation and coding scheme for a 40 MHz channel width;
the MCS Selector field set to 5 indicates that the MCS Index field specifies values taken from a third one of the tables indicating a very high throughput modulation and coding scheme for a 80 MHz channel width; and
the MCS Selector field set to 6 indicates that the MCS Index field specifies values taken from a fourth one of the tables indicating a very high throughput modulation and coding scheme for a 160 MHz or 80+80 MHz channel width.

5. The method of claim 2, wherein:
the second field specifies the number of spatial streams;
the index specifies a row of the identified table; or
the second field specifies the number of spatial streams and the index specifies a row of the identified table.

6. The method of claim 2, wherein the Rate Identification field further comprises a third field that specifies a PHY rate.

7. The method of claim 6, wherein the first field indicates whether a value contained in the third field corresponds to a unit of greater than 0.5 Mbits/s.

8. The method of claim 1, wherein the bandwidth is 20 MHz, 40 MHz, 80 MHz, 80+80 MHz, or 160 MHz.

9. The method of claim 1, wherein the communication comprises 802.11ac Very High Throughput (VHT) transmission by the apparatus.

10. An apparatus for communication, comprising:
a processing system configured to:
  determine transmission parameters for communication with another apparatus, wherein the determined transmission parameters comprise a number of spatial streams, a bandwidth, and a modulation and coding scheme,
  identify a table of a set of tables of transmission parameters, wherein the identification of the table is based on the number of spatial streams and the bandwidth, and
  determine an index from the identified table, wherein the determination of the index is based on the modulation and coding scheme; and
a transmitter configured to transmit a frame to the other apparatus, wherein the frame contains indications of: the index, the number of spatial streams, and the bandwidth.

11. The apparatus of claim 10, wherein:
the frame comprises a Rate Identification field;
the Rate Identification field comprises a first field and a second field; and
the first field indicates whether the second field specifies the index.

12. The apparatus of claim 11, wherein:
the first field comprises an MCS Selector field; and
the second field comprises an MCS Index field.

13. The apparatus of claim 12, wherein:
the MCS Selector field set to 3 indicates that the MCS Index field specifies values taken from a first one of the tables indicating a very high throughput modulation and coding scheme for a 20 MHz channel width;
the MCS Selector field set to 4 indicates that the MCS Index field specifies values taken from a second one of the tables indicating a very high throughput modulation and coding scheme for a 40 MHz channel width;
the MCS Selector field set to 5 indicates that the MCS Index field specifies values taken from a third one of the tables indicating a very high throughput modulation and coding scheme for a 80 MHz channel width; and
the MCS Selector field set to 6 indicates that the MCS Index field specifies values taken from a fourth one of the tables indicating a very high throughput modulation and coding scheme for a 160 MHz or 80+80 MHz channel width.

14. The apparatus of claim 11, wherein:
the second field specifies the number of spatial streams;
the index specifies a row of the identified table; or
the second field specifies the number of spatial streams and the index specifies a row of the identified table.

15. The apparatus of claim 11, wherein the Rate Identification field further comprises a third field that specifies a PHY rate.

16. The apparatus of claim 15, wherein the first field indicates whether a value contained in the third field corresponds to a unit of greater than 0.5 Mbits/s.

17. The apparatus of claim 10, wherein the bandwidth is 20 MHz, 40 MHz, 80 MHz, 80+80 MHz, or 160 MHz.

18. The apparatus of claim 10, wherein the communication comprises 802.11ac Very High Throughput (VHT) transmission by the other apparatus.

19. An apparatus for communication, comprising:
means for determining transmission parameters for communication with another apparatus, wherein the determined transmission parameters comprise a number of spatial streams, a bandwidth, and a modulation and coding scheme;
means for identifying a table of a set of tables of transmission parameters, wherein the identification of the table is based on the number of spatial streams and the bandwidth;
means for determining an index from the identified table, wherein the determination of the index is based on the modulation and coding scheme; and
means for transmitting a frame to the other apparatus, wherein the frame contains indications of: the index, the number of spatial streams, and the bandwidth.

20. The apparatus of claim 19, wherein:
the frame comprises a Rate Identification field;
the Rate Identification field comprises a first field and a second field; and
the first field indicates whether the second field specifies the index.

21. The apparatus of claim 20, wherein:
the first field comprises an MCS Selector field; and
the second field comprises an MCS Index field.

22. The apparatus of claim 21, wherein:
the MCS Selector field set to 3 indicates that the MCS Index field specifies values taken from a first one of the tables indicating a very high throughput modulation and coding scheme for a 20 MHz channel width;

the MCS Selector field set to 4 indicates that the MCS Index field specifies values taken from a second one of the tables indicating a very high throughput modulation and coding scheme for a 40 MHz channel width;
the MCS Selector field set to 5 indicates that the MCS Index field specifies values taken from a third one of the tables indicating a very high throughput modulation and coding scheme for a 80 MHz channel width; and
the MCS Selector field set to 6 indicates that the MCS Index field specifies values taken from a fourth one of the tables indicating a very high throughput modulation and coding scheme for a 160 MHz or 80+80 MHz channel width.

23. The apparatus of claim 20, wherein:
the second field specifies the number of spatial streams; the index specifies a row of the identified table; or
the second field specifies the number of spatial streams and the index specifies a row of the identified table.

24. The apparatus of claim 20, wherein the Rate Identification field further comprises a third field that specifies a PHY rate.

25. The apparatus of claim 24, wherein the first field indicates whether a value contained in the third field corresponds to a unit of greater than 0.5 Mbits/s.

26. The apparatus of claim 19, wherein the bandwidth is 20 MHz, 40 MHz, 80 MHz, 80+80 MHz, or 160 MHz.

27. The apparatus of claim 19, wherein the communication comprises 802.11ac Very High Throughput (VHT) transmission by the other apparatus.

28. A computer-program product for communication, comprising:
non-transitory computer-readable medium comprising codes executable to:
determine transmission parameters for communication with an apparatus, wherein the determined transmission parameters comprise a number of spatial streams, a bandwidth, and a modulation and coding scheme;
identify a table of a set of tables of transmission parameters, wherein the identification of the table is based on the number of spatial streams and the bandwidth;
determine an index from the identified table, wherein the determination of the index is based on the modulation and coding scheme; and
transmit a frame to the apparatus, wherein the frame contains indications of: the index, the number of spatial streams, and the bandwidth.

29. A wireless node, comprising:
at least one antenna;
a processing system configured to:
determine transmission parameters for communication with another wireless node, wherein the determined transmission parameters comprise a number of spatial streams, a bandwidth, and a modulation and coding scheme,
identify a table of a set of tables of transmission parameters, wherein the identification of the table is based on the number of spatial streams and the bandwidth, and
determine an index from the identified table, wherein the determination of the index is based on the modulation and coding scheme; and
a transmitter configured to transmit a frame, via the at least one antenna, to the other wireless node, wherein the frame contains indications of: the index, the number of spatial streams, and the bandwidth.

30. A method of communication, comprising:
receiving a frame from an apparatus, wherein the frame contains indications of: an index, a number of spatial streams, and a bandwidth;
identifying a table of a set of tables of transmission parameters, wherein the identification of the table is based on the number of spatial streams and the bandwidth;
selecting a modulation and coding scheme from the identified table, wherein the selection of the modulation and coding scheme is based on the index; and
transmitting data to the apparatus, wherein the transmission is conducted according to the number of spatial streams, the bandwidth, and the selected modulation and coding scheme.

31. The method of claim 30, wherein:
the frame comprises a Rate Identification field;
the Rate Identification field comprises a first field and a second field; and
the first field indicates whether the second field specifies the index.

32. The method of claim 31, wherein:
the first field comprises an MCS Selector field; and
the second field comprises an MCS Index field.

33. The method of claim 32, wherein:
the MCS Selector field set to 3 indicates that the MCS Index field specifies values taken from a first one of the tables indicating a very high throughput modulation and coding scheme for a 20 MHz channel width;
the MCS Selector field set to 4 indicates that the MCS Index field specifies values taken from a second one of the tables indicating a very high throughput modulation and coding scheme for a 40 MHz channel width;
the MCS Selector field set to 5 indicates that the MCS Index field specifies values taken from a third one of the tables indicating a very high throughput modulation and coding scheme for a 80 MHz channel width; and
the MCS Selector field set to 6 indicates that the MCS Index field specifies values taken from a fourth one of the tables indicating a very high throughput modulation and coding scheme for a 160 MHz or 80+80 MHz channel width.

34. The method of claim 31, wherein:
the second field specifies the number of spatial streams;
the index specifies a row of the identified table; or
the second field specifies the number of spatial streams and the index specifies a row of the identified table.

35. The method of claim 31, wherein the Rate Identification field further comprises a third field that specifies a PHY rate.

36. The method of claim 35, wherein the first field indicates whether a value contained in the third field corresponds to a unit of greater than 0.5 Mbits/s.

37. The method of claim 30, wherein the bandwidth is 20 MHz, 40 MHz, 80 MHz, 80+80 MHz, or 160 MHz.

38. The method of claim 30, wherein the communication comprises 802.11ac Very High Throughput (VHT) transmission to the apparatus.

39. An apparatus for communication, comprising:
a receiver configured to receive a frame from another apparatus, wherein the frame contains indications of: an index, a number of spatial streams, and a bandwidth;
a processing system configured to:
identify a table of a set of tables of transmission parameters, wherein the identification of the table is based on the number of spatial streams and the bandwidth, and elect a modulation and coding scheme from the identified table, wherein the selection of the modulation and coding scheme is based on the index; and
a transmitter configured to transmit data to the other apparatus, wherein the transmission is conducted according to the number of spatial streams, the bandwidth, and the selected modulation and coding scheme.

40. The apparatus of claim 39, wherein:
the frame comprises a Rate Identification field;
the Rate Identification field comprises a first field and a second field; and
the first field indicates whether the second field specifies the index.

41. The apparatus of claim 40, wherein:
the first field comprises an MCS Selector field; and
the second field comprises an MCS Index field.

42. The apparatus of claim 41, wherein:
the MCS Selector field set to 3 indicates that the MCS Index field specifies values taken from a first one of the tables indicating a very high throughput modulation and coding scheme for a 20 MHz channel width;
the MCS Selector field set to 4 indicates that the MCS Index field specifies values taken from a second one of the tables indicating a very high throughput modulation and coding scheme for a 40 MHz channel width;
the MCS Selector field set to 5 indicates that the MCS Index field specifies values taken from a third one of the tables indicating a very high throughput modulation and coding scheme for a 80 MHz channel width; and
the MCS Selector field set to 6 indicates that the MCS Index field specifies values taken from a fourth one of the tables indicating a very high throughput modulation and coding scheme for a 160 MHz or 80+80 MHz channel width.

43. The apparatus of claim 40, wherein:
the second field specifies the number of spatial streams;
the index specifies a row of the identified table; or
the second field specifies the number of spatial streams and the index specifies a row of the identified table.

44. The apparatus of claim 40, wherein the Rate Identification field further comprises a third field that specifies a PHY rate.

45. The apparatus of claim 44, wherein the first field indicates whether a value contained in the third field corresponds to a unit of greater than 0.5 Mbits/s.

46. The apparatus of claim 39, wherein the bandwidth is 20 MHz, 40 MHz, 80 MHz, 80+80 MHz, or 160 MHz.

47. The apparatus of claim 39, wherein the communication comprises 802.11ac Very High Throughput (VHT) transmission by the apparatus.

48. An apparatus for communication, comprising:
means for receiving a frame from another apparatus, wherein the frame contains indications of: an index, a number of spatial streams, and a bandwidth;
means for identifying a table of a set of tables of transmission parameters, wherein the identification of the table is based on the number of spatial streams and the bandwidth;
means for selecting a modulation and coding scheme from the identified table, wherein the selection of the modulation and coding scheme is based on the index; and
means for transmitting data to the other apparatus, wherein the transmission is conducted according to the number of spatial streams, the bandwidth, and the selected modulation and coding scheme.

49. The apparatus of claim 48, wherein:
the frame comprises a Rate Identification field;
the Rate Identification field comprises a first field and a second field; and
the first field indicates whether the second field specifies the index.

50. The apparatus of claim 49, wherein:
the first field comprises an MCS Selector field; and
the second field comprises an MCS Index field.

51. The apparatus of claim 50, wherein:
the MCS Selector field set to 3 indicates that the MCS Index field specifies values taken from a first one of the tables indicating a very high throughput modulation and coding scheme for a 20 MHz channel width;
the MCS Selector field set to 4 indicates that the MCS Index field specifies values taken from a second one of the tables indicating a very high throughput modulation and coding scheme for a 40 MHz channel width;
the MCS Selector field set to 5 indicates that the MCS Index field specifies values taken from a third one of the tables indicating a very high throughput modulation and coding scheme for a 80 MHz channel width; and
the MCS Selector field set to 6 indicates that the MCS Index field specifies values taken from a fourth one of the tables indicating a very high throughput modulation and coding scheme for a 160 MHz or 80+80 MHz channel width.

52. The apparatus of claim 49, wherein:
the second field specifies the number of spatial streams;
the index specifies a row of the identified table; or
the second field specifies the number of spatial streams and the index specifies a row of the identified table.

53. The apparatus of claim 49, wherein the Rate Identification field further comprises a third field that specifies a PHY rate.

54. The apparatus of claim 53, wherein the first field indicates whether a value contained in the third field corresponds to a unit of greater than 0.5 Mbits/s.

55. The apparatus of claim 48, wherein the bandwidth is 20 MHz, 40 MHz, 80 MHz, 80+80 MHz, or 160 MHz.

56. The apparatus of claim 48, wherein the communication comprises 802.11ac Very High Throughput (VHT) transmission by the apparatus.

57. A computer-program product for communication, comprising:
non-transitory computer-readable medium comprising codes executable to:
receive a frame from an apparatus, wherein the frame contains indications of: an index, a number of spatial streams, and a bandwidth;
identify a table of a set of tables of transmission parameters, wherein the identification of the table is based on the number of spatial streams and the bandwidth;
select a modulation and coding scheme from the identified table, wherein the selection of the modulation and coding scheme is based on the index; and
transmit data to the apparatus, wherein the transmission is conducted according to the number of spatial streams, the bandwidth, and the selected modulation and coding scheme.

58. A wireless node, comprising:
at least one antenna;
a receiver configured to receive a frame, via the at least one antenna, from another apparatus, wherein the frame contains indications of: an index, a number of spatial streams, and a bandwidth;

a processing system configured to:
: identify a table of a set of tables of transmission parameters, wherein the identification of the table is based on the number of spatial streams and the bandwidth, and
: select a modulation and coding scheme from the identified table, wherein the selection of the modulation and coding scheme is based on the index; and
a transmitter configured to transmit data, via the at least one antenna, to the other apparatus, wherein the transmission is conducted according to the number of spatial streams, the bandwidth, and the selected modulation and coding scheme.

* * * * *